United States Patent

(12) United States Patent
Hou

(10) Patent No.: US 6,913,578 B2
(45) Date of Patent: Jul. 5, 2005

(54) METHOD FOR CUSTOMIZING AUDIO SYSTEMS FOR HEARING IMPAIRED

(75) Inventor: Zezhang Hou, Cupertino, CA (US)

(73) Assignee: Apherma Corporation, Sunnyvale, CA (US)

( * ) Notice: Subject to any disclaimer, the term of this patent is extended or adjusted under 35 U.S.C. 154(b) by 431 days.

(21) Appl. No.: 10/133,816

(22) Filed: Apr. 24, 2002

(65) Prior Publication Data

US 2002/0183648 A1 Dec. 5, 2002

Related U.S. Application Data

(60) Provisional application No. 60/288,130, filed on May 3, 2001.

(51) Int. Cl.[7] .......................... A61B 5/00; H04M 11/00
(52) U.S. Cl. ................. 600/559; 381/320; 379/52; 379/395; 455/899
(58) Field of Search ..................... 600/559; 381/312, 381/314, 315, 58–60, 320; 379/52, 390.01, 395; 455/899; 73/585

(56) References Cited

U.S. PATENT DOCUMENTS

| | | | | | |
|---|---|---|---|---|---|
| 3,808,354 | A | * | 4/1974 | Feezor et al. | 73/585 |
| 3,974,335 | A | * | 8/1976 | Blackledge | 73/585 |
| 5,226,086 | A | * | 7/1993 | Platt | 381/58 |
| 6,061,431 | A | * | 5/2000 | Knappe et al. | 379/52 |
| 6,319,207 | B1 | * | 11/2001 | Naidoo | 600/559 |
| 6,322,521 | B1 | * | 11/2001 | Hou | 600/559 |
| 6,674,862 | B1 | * | 1/2004 | Magilen | 600/559 |

FOREIGN PATENT DOCUMENTS

| JP | 08191340 | 7/1996 |
|---|---|---|
| JP | 11261356 | 9/1999 |
| WO | WO 00/64350 | 11/2000 |
| WO | WO 01/52737 A1 | 7/2001 |

* cited by examiner

*Primary Examiner*—Eric F. Winakur
(74) *Attorney, Agent, or Firm*—Bever Weaver & Thomas, LLP

(57) ABSTRACT

Improved approaches to assist those having hearing loss are disclosed. One approach pertains to providing customization of personal audio systems for a hearing impaired individual. Another approach pertains to designing and producing an audio product that includes components or software that can be customized for hearing impaired individuals. The customization provided by either approach can be performed on-line or off-line.

33 Claims, 4 Drawing Sheets

METHOD FOR CUSTOMIZING AUDIO SYSTEMS FOR HEARING IMPAIRED

CROSS-REFERENCE TO RELATED APPLICATIONS

This application claims priority of U.S. Provisional Application No. 60/288,130, filed May 3, 2001, and entitled "METHOD FOR CUSTOMIZING AUDIO SYSTEMS FOR HEARING IMPAIRED," the content of which is hereby incorporated by reference.

This application is related to U.S. application Ser. No. 09/541,366, filed Mar. 31, 2000, and entitled "METHOD AND SYSTEM FOR ON-LINE HEARING EXAMINATION AND CORRECTION," now U.S. Pat. No. 6,322,521, the content of which is hereby incorporated by reference. This application is also related to U.S. application Ser. No. 09/540,577, filed Mar. 30, 2000, and entitled "METHOD AND SYSTEM FOR ON-LINE HEARING EXAMINATION USING CALIBRATED LOCAL MACHINE," the content of which is hereby incorporated by reference.

BACKGROUND OF THE INVENTION

1. Field of the Invention

The present invention relates to audio systems and, more particularly, to customizing personal audio systems for hearing impaired individuals.

2. Description of the Related Art

One out of ten people suffer from some degree of hearing loss. However, due to stigma, cost, and availability only about 20% of those who have hearing loss wear hearing aids. In contrast, most people have a telephone and many people have mobile phones (e.g., cellular phones). About 70% of people in the United States have a mobile telephone. Currently, mobile phones are only intended for the normal hearing population and cannot be used by hearing impaired individuals who do not use hearing aids. Thus, the majority of the hearing impaired population lives regrettably without use of a mobile phone.

Since the degree of hearing loss varies from person to person, the amplification requirement for each hearing-impaired individual can be significantly different. Special expertise is required in order to customize a mobile phone for a specific hearing-impaired individual. What makes this situation more difficult is that most hearing impaired people have never visited a hearing specialist and do not have any information about their hearing loss, making it impossible to customize mobile phones and other telephone systems for them.

In most developed countries, hearing loss is diagnosed using specialized equipment known as an audiometer. Typically, a patient must visit a hearing specialist's office or an ear, nose and throat (ENT) doctor's office to have hearing loss testing performed. If hearing loss is diagnosed, the hearing specialist or doctor will counsel the patient to consider using a hearing aid. If the patient chooses to purchase a hearing aid, the hearing specialist or doctor has to spend additional time fitting the hearing aid to the patient. All these services are expensive and usually not covered by health insurance or the government.

As noted above, conventional hearing loss testing is performed using an audiometer. The audiometer presents a calibrated pure tone signal to the patient via a transducer, such as a headphone, an earphone or a loudspeaker to one of the patient's ears. If the patient hears the tone, the level of the tone will be reduced and presented to the patient again. If the patient cannot hear the tone, the level of the tone will be increased and presented to patient again. This procedure is repeated many times until a certain number of reversals from decreasing the tone to increasing the tone have been reached. The hearing threshold of the patient is defined as the signal level at which the patient can hear the tone 50 percent (50%) of the time the tone is presented to the patient. The hearing threshold can be derived from the various reversal levels. For each ear, the above procedure is usually repeated at 125, 250, 500, 1000, 2000, 4000, and 8000 Hz. If the difference of the hearing thresholds at two adjacent frequencies exceeds a critical value (e.g., 20 dB), an additional test can be performed at a middle frequency. Often, middle frequencies are only applied when needed for frequencies between 500 to 8000 Hz. Accordingly, the maximum number of testing frequencies is usually eleven (e.g., 125, 250, 500, 750, 1000, 1500, 2000, 3000, 4000, 6000, and 8000 Hz).

In order for the hearing loss test results to be meaningful, the testing system (namely, the audiometer) must be calibrated. In other words, the relationship between the electrical settings in the system and the acoustical pressure delivered to the patients (subjects) must be known. Various components affect the calibration including, but not limited to, an electrical system that generates the stimuli and a listening system (transducer) that converts the electrical signal into acoustic pressure. Calibration is further complicated by the fact that sound levels measured at the eardrum of a human varies from person to person, even when delivered with the same system and identical settings. As a result, calibration of a testing system is often conventionally done using a special coupler for which a reference hearing level of normal listeners has been established. For example, the audiometer with an insertion earphone is usually calibrated in a 2 cubic-centimeters (cc) coupler. When listeners with normal hearing listen to pure tones through an insertion earphone, the sound levels (as measured in the 2 cc coupler) of the pure tones need to be set to the following levels (given in Sound Pressure Level (SPL)) for the sounds to be just audible:

| Frequency (Hz) | Level (dB SPL) |
|---|---|
| 125 | 45 |
| 250 | 35 |
| 500 | 20 |
| 750 | 15 |
| 1000 | 10 |
| 1500 | 8 |
| 2000 | 7 |
| 3000 | 12 |
| 4000 | 20 |
| 6000 | 27 |
| 8000 | 30 |

The above levels are normal reference levels for the insertion earphone in the 2 cc coupler. The reference levels vary for different transducers as well as for different couplers.

Hearing thresholds for a patient are usually expressed in decibels hearing level (dB HL), which is a relative level in reference to the normal reference levels. The reference levels should have been established for the system and transducer used in the test. For example, the normal reference level for an insertion earphone is 7 dB SPL at 2000 Hz as measured in a 2 cc coupler. If the hearing level for a patient is 47 dB SPL at the same frequency as measured in the same 2 cc coupler, the hearing loss for the patient is 40 dB HL. For most commercial audiometers, the normal reference levels can be built into the machine, and the signal level presented to the patient is automatically expressed in dB HL.

Accordingly, there are various problems associated with conventional hearing loss testing. One problem with conventional hearing loss testing is that specialized testing equipment must be used and must be calibrated. Another problem with conventional hearing loss testing is the cost and often limited availability of hearing specialists or ENT doctors to administer the hearing loss examination. As a result, for various reasons, hearing loss testing and hearing loss assistance products are generally not readily available to people.

Thus, there is a need for improved approaches to evaluating hearing loss and assisting those with hearing loss to obtain hearing assistance products or services.

SUMMARY OF THE INVENTION

Broadly speaking, the invention relates to improved ways to assist those who have hearing loss. One aspect of the invention pertains to providing customization of personal audio systems for hearing impaired individuals. Another aspect of the invention pertains to designing and producing an audio product that includes components or software to be customized for hearing impaired individuals. The customization provided by the invention can be performed on-line or off-line.

The invention can be implemented in numerous ways including as a method, system, apparatus, device, and computer readable medium. Several embodiments of the invention are discussed below.

As a method for on-line customization of an audio system for a particular subject with hearing loss, one embodiment of the invention includes at least the acts of: performing a first online hearing test for a reference subject to produce reference parameters; performing a second online hearing test for the particular subject to produce participant parameters; determining a hearing loss for the particular subject based on the participant parameters and the reference parameters; and determining customization parameters for the audio system based on the hearing loss.

As a method for customization of an audio system for a particular user with hearing loss, one embodiment of the invention includes at least the acts of: performing, at the audio system, a first hearing test for a reference user to produce reference parameters; performing, at the audio system, a second hearing test for the particular user to produce participant parameters; determining, at the audio system, a hearing loss for the particular user based on the participant parameters and the reference parameters; determining, at the audio system, customization parameters for the audio system based on the hearing loss; and modifying the audio system with the customization parameters to customize the audio system for the participating user.

As a customizable audio system for hearing impaired individuals, one embodiment of the invention includes at least a processor for executing program code, and a memory device operatively connected to the processor. The memory device stores at least: first computer program code for performing or assisting performance of a first hearing test for a reference subject to produce reference parameters; second computer program code for performing or assisting performance of a second hearing test for a hearing impaired user to produce participant parameters; third computer program code for determining hearing loss for the participating subject based on the participant parameters and the reference parameters; fourth computer program code for determining customization parameters for the audio system based on the hearing loss; and fifth computer program code for modifying the audio system with the customization parameters to produce the customized audio system the hearing impaired user.

As a customizable audio system for hearing impaired individuals, the audio system comprises a computer readable medium, the computer readable medium includes at least: first computer program code for performing or assisting performance of a first hearing test for a reference subject to produce reference parameters; second computer program code for performing or assisting performance of a second hearing test for a hearing impaired user to produce participant parameters; third computer program code for determining hearing loss for the participating subject based on the participant parameters and the reference parameters; fourth computer program code for determining customization parameters for the audio system based on the hearing loss; and fifth computer program code for modifying the audio system with the customization parameters to produce the customized audio system the hearing impaired user.

Other aspects and advantages of the invention will become apparent from the following detailed description taken in conjunction with the accompanying drawings which illustrate, by way of example, the principles of the invention.

BRIEF DESCRIPTION OF THE DRAWINGS

The invention will be readily understood by the following detailed description in conjunction with the accompanying drawings, wherein like reference numerals designate like structural elements, and in which.

DETAILED DESCRIPTION OF THE INVENTION

The invention relates to improved ways to assist those who have hearing loss. One aspect of the invention pertains to providing customization of personal audio systems for a hearing impaired individual. Another aspect of the invention pertains to designing and producing an audio product that includes components or software that can be customized for hearing impaired individuals. The customization provided by the invention can be performed on-line or off-line. These and other aspects of the invention are discussed in detail below.

Embodiments of these aspects of the invention are discussed below with reference to FIGS. 1–4. However, those skilled in the art will readily appreciate that the detailed description given herein with respect to these figures is for explanatory purposes as the invention extends beyond these limited embodiments.

Figure 1:
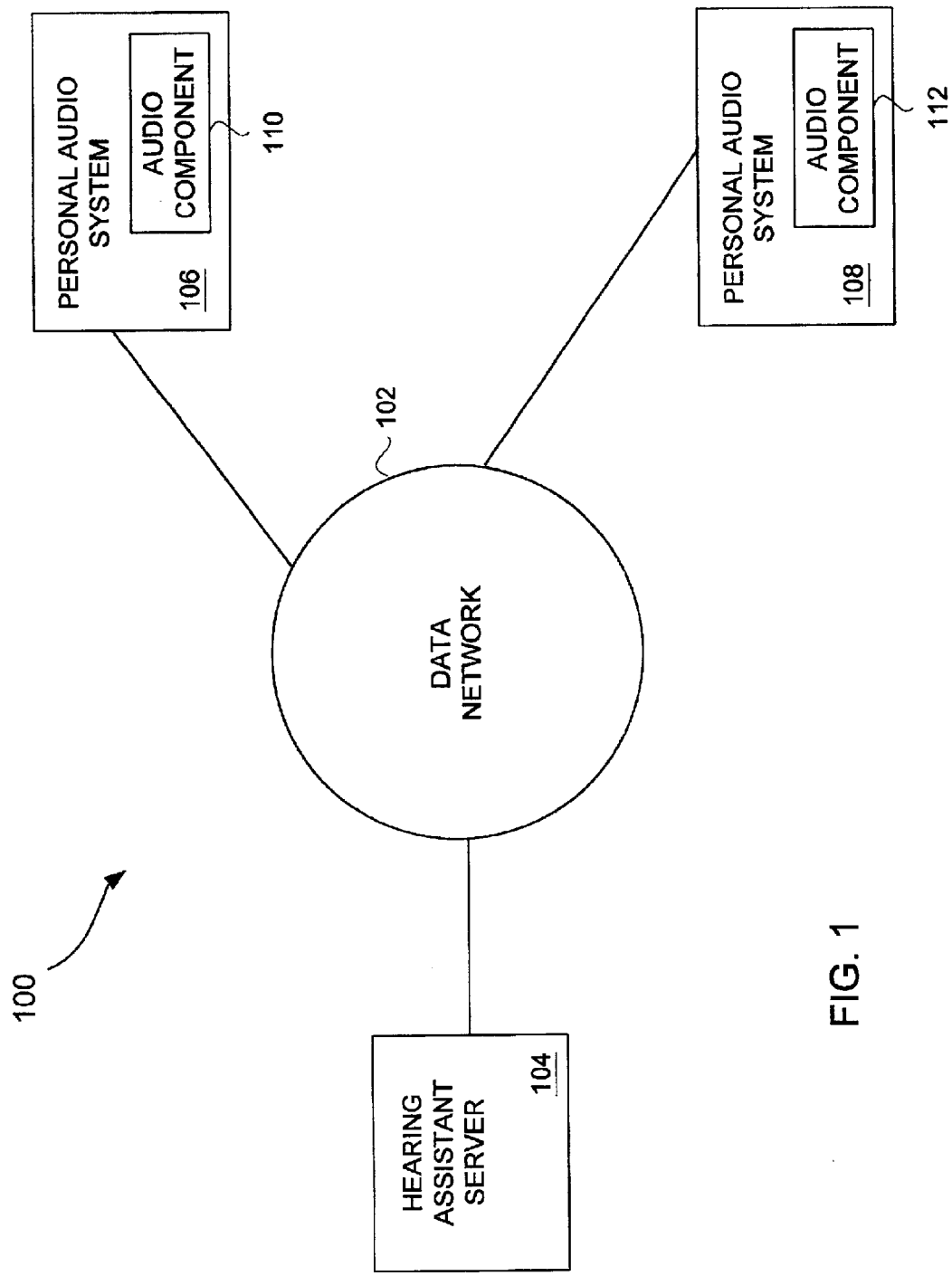
FIG. 1 shows a network-based hearing evaluation and audio customization system according to one embodiment of the invention.

FIG. 1 is a network-based hearing evaluation and customization system 100 according to one embodiment of the invention. The network-based hearing evaluation and customization system 100 includes a data network 102. The data network 102 can take a variety of forms. The data network 102 provides a communication network through which a hearing assistant server 104 can communicate with personal audio systems 106 and 108. For example, the data network 102 can be or include the Internet, a wide area network (WAN) or a local area network (LAN). The data network 102 can also include a telephone network or a cable network. The data network 102 can be wired or wireless, or a combination of both.

As shown in FIG. 1, the personal audio system 106 includes an audio component 110, and the personal audio system 108 includes an audio component 112. It should be understood that the network-based hearing evaluation and customization system 100 can include one or more personal audio systems, such as the personal audio systems 106 and 108. The audio component 110 of the personal audio system 106 provides for an audio (or sound) output at the personal audio system 106. The audio component 112 of the personal audio system 106 provides for an audio (or sound) output at the personal audio system 108. A sound output provided by the audio components 110 and 112 is directed at a subject. Typically, the subject is the user of the corresponding personal audio system. The audio components 110 and 112 can take a variety of forms. For example, the audio components 110 and 112 can pertain to sound amplifiers residing in the personal audio systems together with a speaker (loud-speaker), an earphone or a headset. As another example, the audio components 110 and 112 can be provided as peripheral devices that couple to the personal audio systems. In one implementation, the personal audio system is a standard telephone or mobile (e.g., cellular) phone and thus typically includes one or more audio components. In another implementation, the personal audio system is a media player, such as a MP3 player or a compact-disc player. In still another implementation, the personal audio system incorporates a network browser for accessing the data network 102. The personal audio system normally includes at least a processor (e.g., microprocessor or controller) and data storage (memory). The audio components can be wholly or partly provided within the processor or the controller, the data storage (e.g., program code stored therein), or can reside in other hardware elements utilized by the personal audio system.

The network-based hearing evaluation and customization system 100 operates in a client-server manner, wherein the hearing assistant server 104 is the server and the personal audio systems 106 and 108 are the clients. The personal audio systems 106 and 108 can interact with the hearing assistant server 104 to perform on-line hearing evaluations (examinations). As noted above, the hearing evaluations are for subjects, which are typically the users of the personal audio systems. In addition, the personal audio systems 106 and 108 can access the hearing assistant server 104 to perform hearing customization for the users. For example, if a user of a particular personal audio system has been diagnosed as having hearing loss, the hearing assistant server 104 can cause manipulation of the device parameters in the personal audio system to compensate for the hearing loss associated with the user of the personal audio system. Consequently, the personal audio system is able to be customized for the user based on his/her hearing loss.

Figure 2:
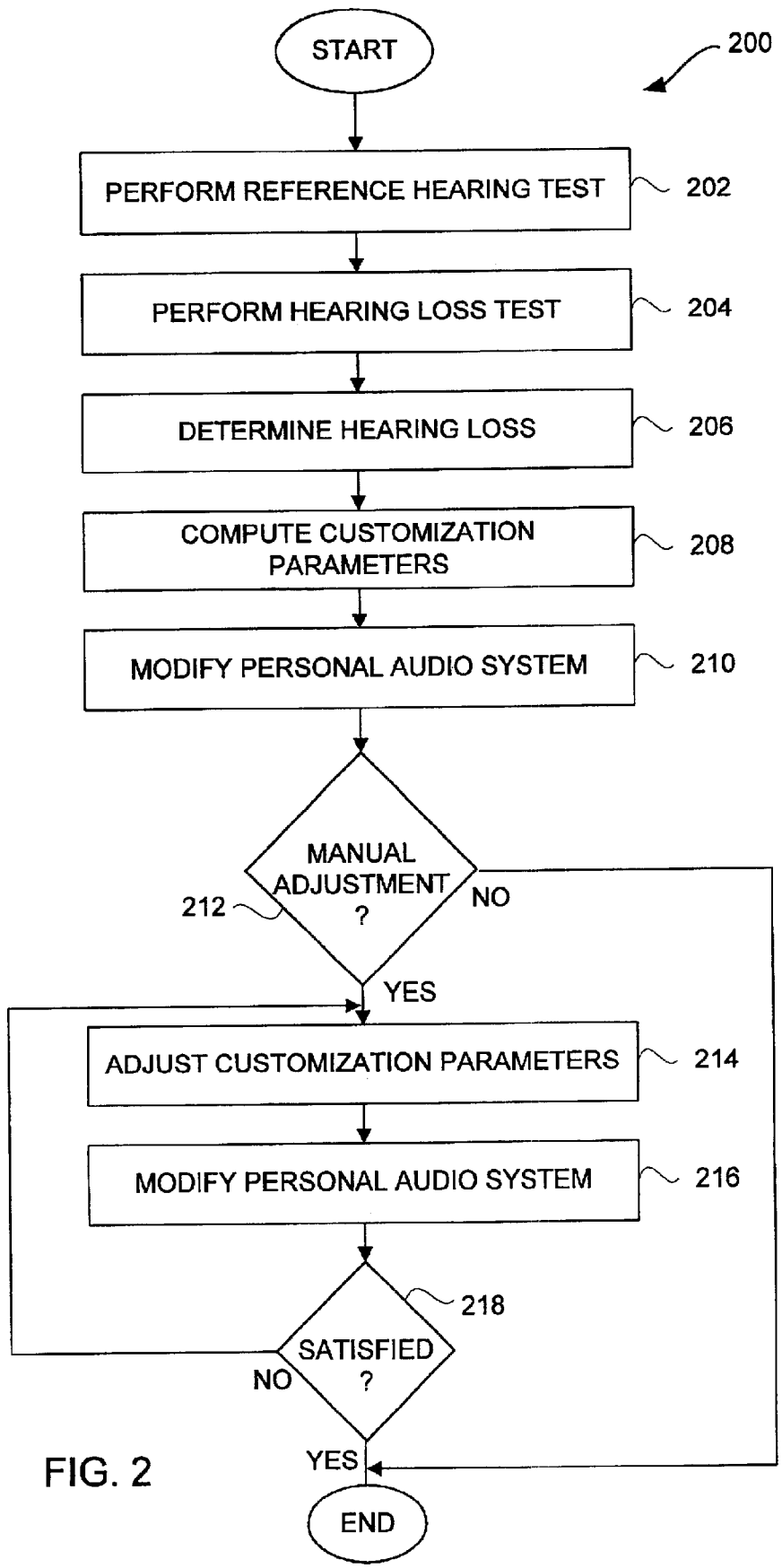
FIG. 2 illustrates a flow diagram of personal audio customization processing according to one embodiment of the invention.

FIG. 2 illustrates a flow diagram of personal audio customization processing 200 according to one embodiment of the invention. In one embodiment of the invention, the personal audio customization processing 200 is performed on-line. A personal audio system is connected to a hearing assistant server (such as the hearing assistant server 104 illustrated in FIG. 1) and, in such an embodiment, the processing is at least partially controlled by the hearing assistant server. In another embodiment, the personal audio customization processing 200 is performed off-line using a personal audio system. For such an embodiment, the control software and hardware can all reside in the personal audio system.

The personal audio customization processing 200 begins by performing 202 a reference hearing test on a reference subject. The reference hearing test can be performed using the personal audio system. The reference subject can be a person known to have normal hearing or a person whose hearing can be identified as being normal, such as by listening to some natural sounds or sounds generated from special devices that have been calibrated to produce sound at certain levels. The reference hearing test establishes reference parameters for the personal audio system. In one embodiment, the reference hearing test is performed using pure tones within the audio frequency range, and the established reference parameters are normal reference levels. In one embodiment of the invention, the pure tones are downloaded from the hearing assistant server 104 illustrated in FIG. 1. In another embodiment of the invention, the pure tones are generated by the personal audio system locally.

Next, a hearing loss test is performed 204 on a particular subject (target subject). Typically, the target subject is the user of the personal audio system who suspects he/she might suffer from hearing loss. The hearing loss test establishes target parameters for the personal audio system. In one embodiment, the hearing loss test is performed using pure tones within the audio frequency range, and the difference between the established target parameters and the reference parameters are hearing loss for the target subject. In one embodiment of the invention, the pure tones are downloaded from the hearing assistant server 104 illustrated in FIG. 1. In another embodiment of the invention, the pure tones are generated from the personal audio system locally.

Next, hearing loss of the target subject can be determined 206 based on the target parameters and the reference parameters. In one embodiment, the hearing loss can be expressed as various hearing thresholds for different frequencies. Typically, the hearing loss is expressed relative to normal hearing as determined by the reference parameters (such as numerical values relative to the reference parameters).

After the hearing loss has been determined 206, customization parameters can be computed 208 for the particular audio system. The customization parameters can be used to compensate for the hearing loss of the target subject. In one embodiment of the invention, the customization parameters include gains as a function of frequency and level. For example, a gain for soft sound at a level of 50 dB SPL can be 2, 5,10, 10, and 12 dB at frequencies of 250, 500, 1000, 2000, 4000 Hz, respectively, and a gain for loud sound at a level 80 dB SPL can be 0, 2, 5, 5, 5 dB at frequencies of 250, 500, 1000, 2000, 4000 Hz, respectively. In another embodiment of the invention, the customization parameters are numerical values related to gains as a function of frequency and level. For example, the customization parameters noted above as gain values can be divided by 6.0206. With this embodiment, the representation of the customization parameters is not in dB (decibel), but related to dB (=dB/6.0206). The use of numerical values in this regard makes implementation in either hardware or software very efficient.

After the customization parameters have been computed 208 for the target subject, components (e.g., audio components) in the personal audio system can be modified 210 based on the customization parameters. The components in the personal audio system can be either hardware or software, or both, and serve to at least partially control how sound is produced. In one embodiment, the components are data memory. The customization parameters can be saved in the data memory. In one embodiment, the data memory is a flash memory, EEPROM or other non-volatile memory residing in the personal audio system. In another embodiment, the data memory is a flash memory, EEPROM or other non-volatile memory residing in an auxiliary (e.g., attachment or peripheral) of the personal audio system.

After the components in the personal audio system have been modified 210, the personal audio customization processing 200 can end. More particularly, a decision 212 determines if a manual adjustment of the customization parameters is desired. If the decision 212 determines that manual adjustment is not desired, the personal audio customization processing 200 is complete and ends. On the other hand, if the decision 212 determines that a manual adjustment is desired, the personal audio customization processing 200 continues by manually adjusting 214 part or all of the customization parameters. The manual adjustment of the customization parameters can be performed in a variety of ways. In one embodiment, the manual adjustment pertains to the overall volume of the personal audio system. In another embodiment, the adjustment is pertains to the slope of the frequency response of the personal audio system. The manual adjustment can be one or a combination of hardware, software or a graphical user interface.

Next, the components (e.g., audio components) in the personal audio system can be modified 216 again based on the adjusted customization parameters. After that, a decision 218 determines whether the user is satisfied with the adjustments/modifications. In one embodiment, the decision 218 can be based on the user's perception of listening to some sample sounds or voices. If the user is not satisfied, the processing 200 returns to operation 214 where further manual adjustments can be performed. On the other hand, if the user is satisfied with the results of the adjustments/modifications, the personal audio customization processing 200 is complete and ends.

Although in FIG. 2 the reference subject is tested before the target subject, the reverse situation can be also used. Namely, the target subject can be tested first and then subsequently the reference subject tested. Further, the test data obtained from the testing of a single reference subject can be used to test one or more different target subjects. Alternatively, more than one reference subject can be used in the reference hearing test to establish reference parameters. If more than one reference subject participates in the reference test, the reference parameters can be averaged for all reference subjects. In any case, settings at a test machine (e.g., local machine, such as a computer, or personal audio system) that affect its audio output should not be altered or modified between testing of the reference subjects and the target subjects.

More generally, the personal audio system can be said to be a local machine or to be coupled to a data network (e.g., the data network 102) via a local machine. In one implementation, the local machine is a personal computer (e.g., hand-held computer, portable computer, etc.). In another implementation, the local machine has a network browser thereon for accessing the data network. In the case where the personal audio system couples to the data network via a local machine, the personal audio system can connect to the local machine as a peripheral device. When the local machine is also a personal audio system, the local machine itself includes one or more audio components.

Figure 3:
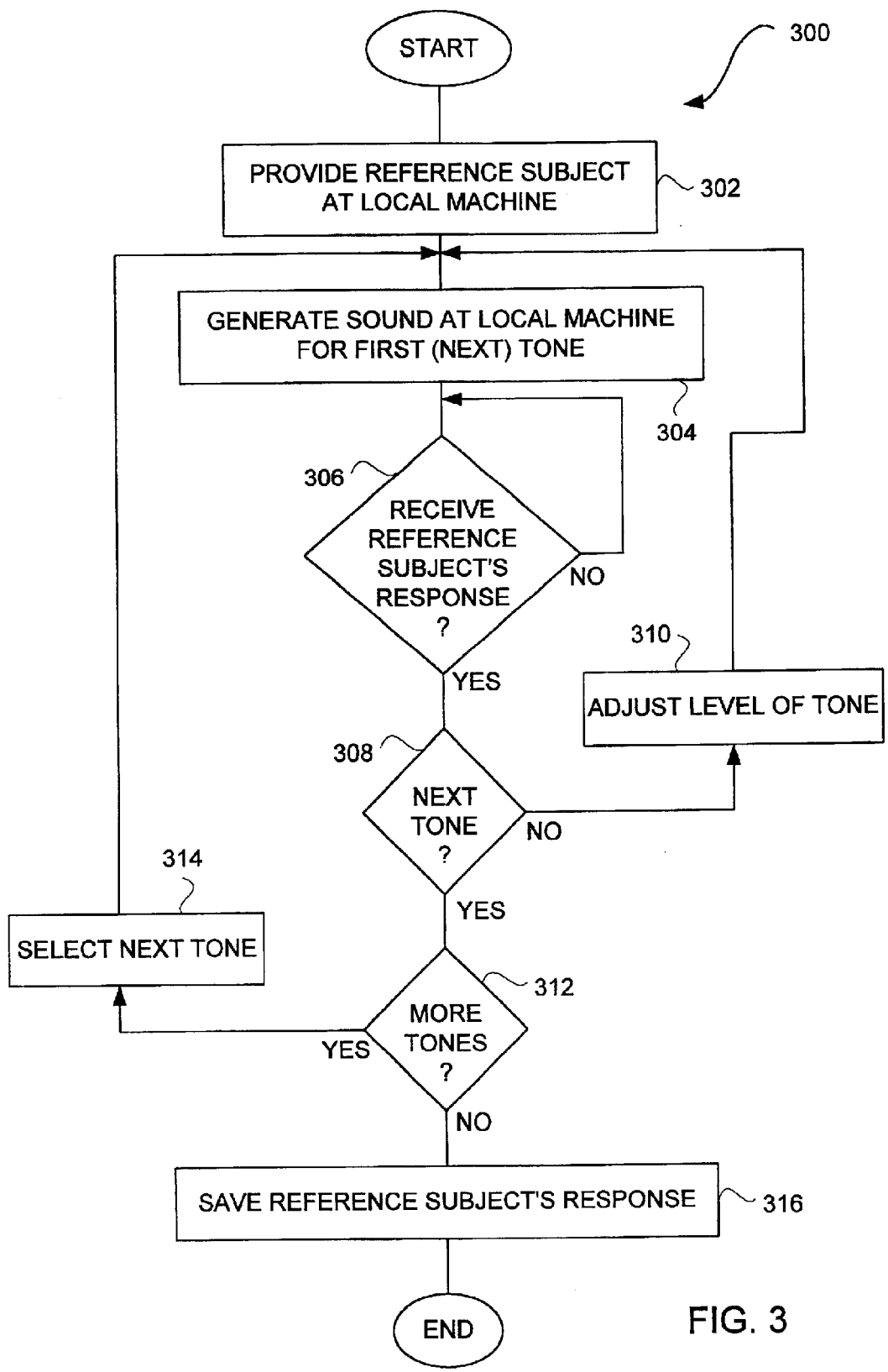
FIG. 3 is a flow diagram of reference hearing testing for a reference subject according to one embodiment of the invention.

FIG. 3 is a flow diagram of reference hearing testing 300 for a reference subject according to one embodiment of the invention. The reference hearing testing 300 is, for example, additional detail on the operations performed with respect to the hearing loss test for the reference subject at operation 202 illustrated in FIG. 2.

The reference hearing testing 300 initially provides 302 a reference subject at a local machine. Sound is then generated 304 at the local machine for a first tone. A decision 306 then determines whether the reference subject's response to the sound generated 304 at the local machine has been received. When the decision 306 determines that the reference subject's response is not yet received, the reference hearing testing 300 awaits such a response. Once the decision 306 determines that the reference subject's response has been received, a decision 308 determines whether a next tone should be processed. When the decision 308 determines that the next tone should not yet be processed, then the level of the tone (current tone) is adjusted 310. Here, the level of the tone is typically adjusted up or down and then the processing returns to repeat the operation 304 and subsequent operations. On the other hand, when the decision 308 determines that a next tone is to be processed, then a decision 312 determines whether there are additional tones to be processed. When the decision 312 determines that there are additional tones to be processed, the next tone is selected 314. Following the selection 314 of the next tone, the reference hearing testing 300 returns to repeat the operation 304 and subsequent operations. Alternatively, when the decision 312 determines that there are no more tones to be processed, the reference subject's response is saved 316. After saving 316 the reference subject's response, the reference hearing testing 300 is complete and ends.

Figure 4:
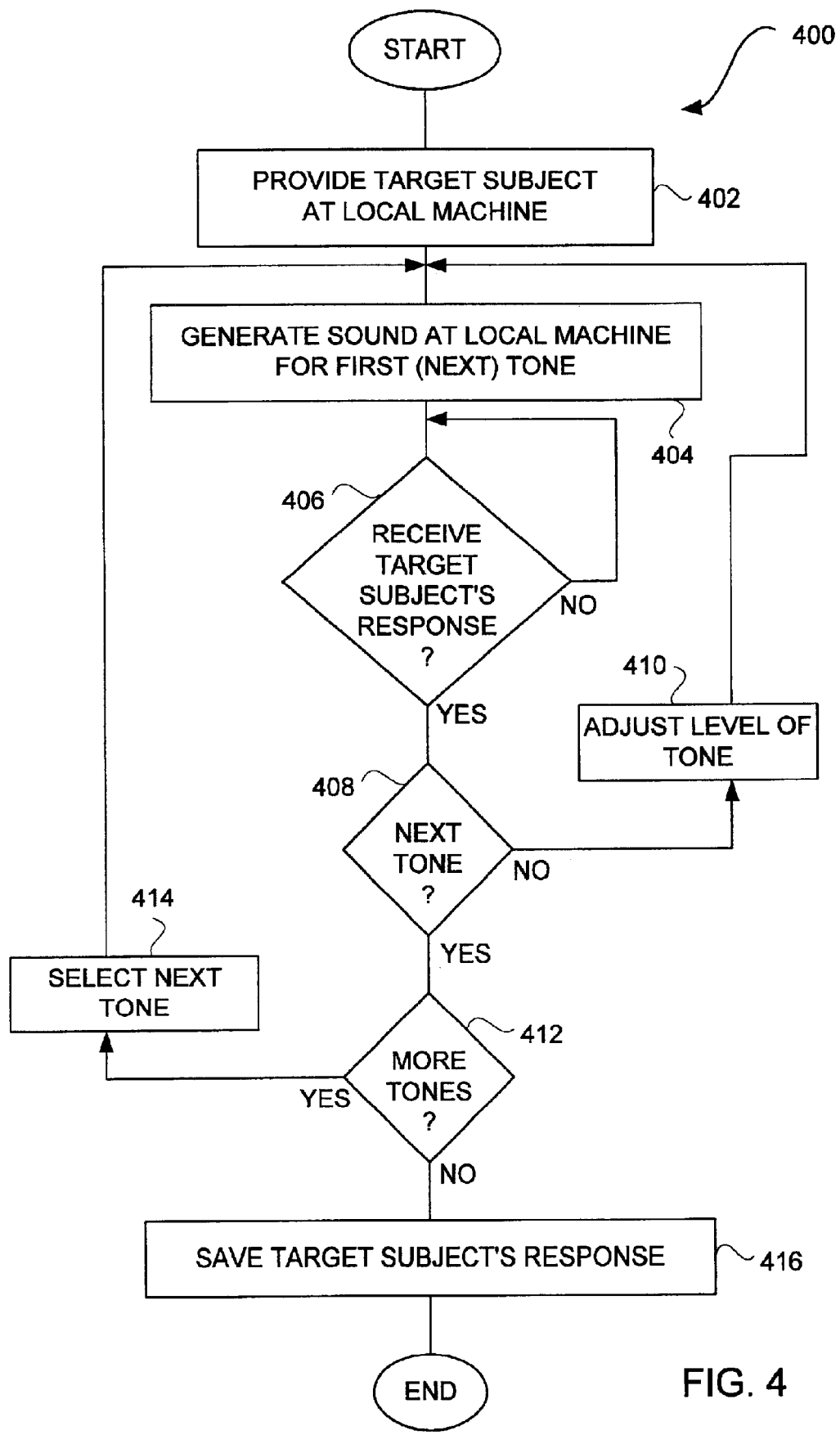
FIG. 4 is a flow diagram of target hearing testing for a target subject according to one embodiment of the invention.

FIG. 4 is a flow diagram of target hearing testing 400 for a target subject according to one embodiment of the invention. The target hearing testing 400 is generally similar to the reference hearing testing 300 illustrated in FIG. 3. One notable difference is that the target hearing testing 400 pertains to a particular target subject, whereas the reference hearing testing 300 pertains to a reference subject. The target hearing testing 400 is, for example, additional detail on the operations performed with respect to the hearing loss test for the target subject at operation 204 illustrated in FIG. 2.

The target hearing testing 400 initially provides 402 a target subject at a local machine. Then, sound is generated 404 at the local machine for a first tone. A decision 406 then determines whether the target subject's response to the sound generated 404 at the local machine has been received. When the decision 406 determines that the target subject's response has not yet been received, the target hearing testing 400 awaits such a response. Once the decision 406 determines that the target subject's response has been received, a decision 408 determines whether a next tone should be processed. When the decision 408 determines that the next tone should not yet be processed, then the level of the tone (current tone) is adjusted 410. Here, the level of the tone is typically adjusted up or down, and then the processing returns to repeat the operation 404 and subsequent operations. On the other hand, when the decision 408 determines that a next tone is to be processed, then a decision 412 determines whether there are additional tones to be processed. When the decision 412 determines that there are additional tones to be processed, the next tone is selected 414. Following the selection 414 of the next tone, the target hearing testing 400 returns to repeat the operation 404 and subsequent operations. Alternatively, when the decision 412 determines that there are no more tones to be processed, the target subject's response is saved 416. After saving 416 the target subject's response, the target hearing testing 400 is complete and ends.

Further, with respect to the hearing testing 300 and 400, the sounds or tones presented to the subject are, for example, preferably pure tones. The personal audio system, or the local machine which operates as a personal audio system, generates the sounds (such as with a sound card) and outputs the sounds to the subject (user) through a speaker, an earphone, or a headset. It should be noted that the sounds can be specifically generated on-demand from the personal audio system, produced using predetermined sound files, or sound files downloaded from a remote server. The subject's response (i.e., whether they hear the sound or not) can be input to the local machine through a wide range of input devices, such as a key pad or Graphical User Interface (GUI) integrated into the personal audio system. Typically, for each tone a reversal sequence is followed. When the subject responds (indicates) that he/she hears the tone, the level of the tone will be reduced and presented to the subject again. When the subject responds (indicates) that he/she cannot hear the tone, the level (i.e., amplitude) of the tone will be increased and presented to the subject again. This procedure will repeat many times until a certain number of reversals from decreasing the tone to increasing the tone have been reached, thereby completing the reversal sequence. The levels for the tones can be generated by particular control of the sound card or by selection of the predetermined sound file for a given tone and amplitude. The hearing threshold of the subject is defined as the signal level at which the patient can hear the tone 50 percent (50%) of the time the tone is presented to the patient. The hearing threshold can be derived from the various reversal levels. For each ear, the above procedure is usually repeated at 125, 250, 500, 1000, 2000, 4000, and 8000 Hz. Further, if the difference of the hearing thresholds at two adjacent frequencies exceeds a critical value (e.g., 20 dB), an additional test can be performed at a middle frequency. Often middle frequencies are only applied when needed for frequencies between 500 to 8000 Hz. Accordingly, the maximum number of testing frequencies is usually eleven (e.g., 125, 250, 500, 750,1000, 1500, 2000, 3000, 4000, 6000, and 8000 Hz). From the various responses provided, the hearing-related parameters can be determined. Typically, these hearing-related parameters are threshold levels for the subject's hearing at the various frequencies tested.

Instead of the reference hearing testing 300, the reference subject's hearing loss can also be used to adjust audio levels at the local machine. Here, a continuous sound (e.g., pulsed or continuous pure tone) is presented to the reference subject. Then, the reference subject adjusts the audio sound output such that it is just audible. Such volume adjustment can be achieved in a variety of ways, such as speaker volume control, volume control displayed on a graphical user interface, or software control. Hence, this approach is another way to set the reference hearing level, though it is less precise than the reference hearing testing 300.

The invention can be implemented in hardware, software or a combination of hardware and software. The invention can also be embodied as computer readable code on a computer readable medium. The computer readable medium is any data storage device that can store data which can thereafter be read by a computer system. Examples of the computer readable medium include read-only memory, random-access memory, CD-ROMs, magnetic tape, optical data storage devices, and carrier waves. The computer readable medium can also be distributed over network-coupled computer systems so that the computer readable code is stored and executed in a distributed fashion.

The advantages of the invention are numerous. Different embodiments or implementations may yield one or more of the following advantages. One advantage of the invention is that the customization of a personal audio system to a user's hearing can be performed. The customization can be performed on-line or off-line. Another advantage of the invention is that no specialized equipment or personnel are needed to perform the customization. Still another advantage of the invention is that the customization of a personal audio system can be completed by the personal audio system itself.

The many features and advantages of the present invention are apparent from the written description and, thus, it is intended by the appended claims to cover all such features and advantages of the invention. Further, since numerous modifications and changes will readily occur to those skilled in the art, it is not desired to limit the invention to the exact construction and operation as illustrated and described. Hence, all suitable modifications and equivalents may be resorted to as falling within the scope of the invention.

What is claimed is:

1. A method for on-line customization of an audio system for a particular subject with hearing loss, said method comprising the acts of:

performing a first on-line hearing test for a reference subject to produce reference parameters;

performimg a second on-line hearing test for the particular subject to produce participant parameters;

determining a hearing loss for the particular subject based on the participant parameters and the reference parameters; and determining customization parameters for the audio system based on the hearing loss, wherein the audio system is a personal audio system, and wherein the personal audio system is a media player.

2. A method as recited in claim 1, wherein said method further comprises:

modifying the audio system in accordance with the customization parameters, thereby customizing the audio system for compensation for the hearing loss of the participating subject.

3. A method as recited claim 2, wherein the audio system is a standard telephone.

4. A method as recited in claim 2, wherein the audio system is a mobile telephone.

5. A method for on-line customization of an audio system for a particular subject with hearing loss, said method comprising the acts of:

performing a first on-line hearing test for a reference subject to produce reference parameters;

performing a second on-line hearing test for the particular subject to produce participant parameters;

determining a hearing loss for the particular subject based on the participant parameters and the reference parameters; and determining customization parameters for the audio system based on the hearing loss, wherein the audio system is a personal audio system, and wherein the personal audio system is a mobile telephone.

6. A method as recited in claim 5, wherein said method further comprises:
   modifying the audio system in accordance with the customization parameters, thereby customizing the audio system for compensation for the hearing loss of the participating subject.

7. A method for on-line customization of an audio system for a particular subject with hearing loss, said method comprising the acts of:
   performing a first on-line hearing test for a reference subject to produce reference parameters;
   performing a second on-line hearing test for the particular subject to produce participant parameters;
   determining a hearing loss for the particular subject based on the participant parameters and the reference parameters; and
   determining customization parameters for the audio system based on the hearing loss,
   wherein the audio system is a telephone.

8. A method for on-line customization of an audio system for a particular subject with hearing loss, said method comprising the acts of:
   performing a first on-line hearing test for a reference subject to produce reference parameters;
   performing a second on-line hearing test for the particular subject to produce participant parameters;
   determining a hearing loss for the particular subject based on the participant parameters and the reference parameters; and
   determining customization parameters for the audio system based on the hearing loss,
   wherein said performing of the first on-line hearing test and the second on-line hearing test are performed with the audio system.

9. A method for on-line customization of an audio system for a particular subject with hearing loss, said method comprising the acts of:
   performing a first on-line hearing test for a reference subject to produce reference parameters;
   performing a second on-line hearing test for the particular subject to produce participant parameters;
   determining a hearing loss for the particular subject based on the participant parameters and the reference parameters; and
   determining customization parameters for the audio system based on the hearing loss,
   wherein said determining of the hearing loss is performed at a remote server, and
   wherein the audio system communicates with an audio server over a data network.

10. A method as recited in claim 9, wherein the data network is the Internet.

11. A method as recited in claim 9, wherein said performing of the first on-line hearing test and the second on-line hearing test are performed on the audio server but controlled by the remote server.

12. A method for on-line customization of an audio system for a particular subject with hearing loss, said method comprising the acts of:
   performing a first on-line hearing test for a reference subject to produce reference parameters;
   performing a second on-line hearing test for the particular subject to produce participant parameters;
   determining a hearing loss for the particular subject based on the participant parameters and the reference parameters; and
   determining customization parameters for the audio system based on the hearing loss,
   wherein said performing of at least one of the first on-line hearing test and the second on-line hearing test uses pure tone stimuli.

13. A method as recited in claim 12, wherein the pure tone stimuli are downloaded from a remote server.

14. A method as recited in claim 12, wherein the pure tone stimuli are generated by the audio system.

15. A method as recited in claim 12, wherein said method further comprises:
   modifying the audio system in accordance with the customization parameters, thereby customizing the audio system for compensation for the hearing loss of the participating subject.

16. A method for on-line customization of an audio system for a particular subject with hearing loss, said method comprising the acts of:
   performing a first on-line hearing test for a reference subject to produce reference parameters;
   performing a second on-line hearing test for the particular subject to produce participant parameters;
   determining a hearing loss for the particular subject based on the participant parameters and the reference parameters; and
   determining customization parameters for the audio system based on the hearing loss,
   wherein said determining of the hearing loss and said determining of the customization parameters are performed in an automated fashion.

17. A method as recited in claim 16, wherein the audio system is a personal computer.

18. A method as recited in claim 16, wherein said method further comprises:
   manually adjusting the customization parameters for the audio system.

19. A method as recited in claim 16, wherein said determining of the hearing loss is performed at the audio system.

20. A method as recited in claim 16, wherein said method further comprises:
   modifying the audio system in accordance with the customization parameters, thereby customizing the audio system for compensation for the hearing loss of the participating subject.

21. A method for customization of an audio system for a particular user with hearing loss, said method comprising the acts of:
   performing, at the audio system, a first hearing test for a reference user to produce reference parameters;
   performing, at the audio system, a second hearing test for the particular user to produce participant parameters;
   determining, at the audio system, a hearing loss for the particular user based on the participant parameters and the reference parameters;
   determining, at the audio system, customization parameters for the audio system based on the hearing loss; and
   modifying the audio system with the customization parameters to customize the audio system for the participating user,
   wherein the audio system is a personal audio system, and
   wherein the personal audio system is a media player or a telephone.

22. A method as recited in claim 21, wherein the telephone is a mobile telephone.

23. A method as recited in claim 21, wherein said method further comprises:

manually adjusting the customization parameters for the audio system.

24. A customizable audio system for hearing impaired individuals, said audio system comprises:

a processor for executing program code; and a memory device operatively connected to said processor, said memory device storing at least:

first computer program code for performing or assisting performance of a first hearing test for a reference subject to produce reference parameters;

second computer program code for performing or assisting performance of a second hearing test for a hearing impaired user to produce participant parameters;

third computer program code for determining hearing loss for the participating subject based on the participant parameters and the reference parameters;

fourth computer program code for determining customization parameters for the audio system based on the hearing loss; and fifth computer program code for modifying the audio system based on the customization parameters.

25. A customizable audio system as recited in claim 24, wherein the first and second hearing tests are on-line hearing tests.

26. A customizable audio system as recited in claim 24, wherein the first and second hearing tests are off-line hearing tests.

27. A customizable audio system as recited in claim 24, wherein at least one of the first and second hearing tests is performed by said customizable audio system.

28. A customizable audio system as recited in claim 24, wherein the audio system is a personal audio system.

29. A customizable audio system as recited in claim 28, wherein the personal audio system is a media player.

30. A customizable audio system as recited in claim 30, wherein the personal audio system is a mobile telephone.

31. A customizable audio system for hearing impaired individuals, said audio system comprises a computer readable medium, said computer readable medium includes at least:

first computer program code for performing or assisting performance of a first hearing test for a reference subject to produce reference parameters;

second computer program code for performing or assisting performance of a second hearing test for a hearing impaired user to produce participant parameters;

third computer program code for determining hearing loss for the participating subject based on the participant parameters and the reference parameters;

fourth computer program code for determining customization parameters for the audio system based on the hearing loss; and fifth computer program code for modifying the audio system based on the customization parameters.

32. A customizable audio system as recited in claim 31, wherein at least one of the first and second hearing tests is performed by said customizable audio system.

33. A customizable audio system as recited in claim 31, wherein at least one of the first and second hearing tests is performed in an on-line manner by said customizable audio system being operatively connected to a remote server via a network.

* * * * *